United States Patent
Shea et al.

(10) Patent No.: US 12,248,612 B2
(45) Date of Patent: Mar. 11, 2025

(54) DATA AGGREGATION AND ANONYMIZATION IN MULTI-TENANT NETWORKS

(71) Applicant: Hint, Inc., Pleasanton, CA (US)

(72) Inventors: Joe Shea, Feasterville-Trevose, PA (US); Reddy Vijay Karthik Tummala, Pleasanton, CA (US); Muthanna Nischal Ammatanda, Fremont, CA (US); Abraham Benjamin de Waal, San Jose, CA (US)

(73) Assignee: Hint, Inc., Pleasanton, CA (US)

( * ) Notice: Subject to any disclaimer, the term of this patent is extended or adjusted under 35 U.S.C. 154(b) by 283 days.

(21) Appl. No.: 17/678,568

(22) Filed: Feb. 23, 2022

(65) Prior Publication Data

US 2023/0267229 A1     Aug. 24, 2023

(51) Int. Cl.
*G06F 21/62*     (2013.01)
*G06F 21/60*     (2013.01)

(52) U.S. Cl.
CPC ........ *G06F 21/6254* (2013.01); *G06F 21/602* (2013.01)

(58) Field of Classification Search
CPC . G06F 21/6254; G06F 21/602; G06F 21/6245
See application file for complete search history.

(56) References Cited

U.S. PATENT DOCUMENTS 8,566,115 B2 * 10/2013 Moore ................ G06F 21/6254
                                                           705/2
9,202,230 B2 * 12/2015 Yarvis ................ G06Q 30/0615

(Continued)

FOREIGN PATENT DOCUMENTS

AU     2013206026 B2     3/2015

OTHER PUBLICATIONS

"U.S. Appl. No. 17/711,283, Final Office Action mailed Jun. 2, 2023", 15 pgs.

(Continued)

*Primary Examiner* — Bruce S Ashley
(74) *Attorney, Agent, or Firm* — Ballard Spahr LLP

(57) ABSTRACT

In some examples, a data aggregator and anonymizer is provided for selective encryption of test data. An example data aggregator and anonymizer can perform operations including receiving first order data from a first data source, the first order data including a mix of sensitive and non-sensitive information, the sensitive information including one or more of Personally Identifiable Information (PII), Protected Health Information (PHI) and Payment Card Industry (PCI) information; receiving second order data from a second data source, the second order data including a different mix of sensitive and non-sensitive information, the sensitive information including one or more of PII, PHI, and PCI information; combining and storing the first and second order data into an aggregated data structure, the aggregated data structure including layers in which stored data resides; identifying the sensitive information; encrypting identified sensitive information stored in at least one layer of the aggregated data structure to create an anonymous body of test data; storing the anonymous body of test data in a database; and providing access to the anonymous body of test data to the first or second data source or a third-party data analyzer.

15 Claims, 15 Drawing Sheets

(56) References Cited

U.S. PATENT DOCUMENTS

| | | | | |
|---|---|---|---|---|
| 9,619,616 | B2* | 4/2017 | Raduchel | G16H 10/60 |
| 9,665,722 | B2* | 5/2017 | Nagasundaram | G06F 21/60 |
| 10,007,915 | B2* | 6/2018 | Singh | G06Q 30/02 |
| 10,204,704 | B1* | 2/2019 | Wurst | G16H 10/20 |
| 10,333,901 | B1* | 6/2019 | Bauman | H04L 63/20 |
| 10,404,741 | B2* | 9/2019 | Peteroy | H04L 63/0421 |
| 10,614,248 | B2* | 4/2020 | Perkins | G06F 21/6254 |
| 11,003,793 | B2* | 5/2021 | Gkoulalas-Divanis | G06F 21/6254 |
| 11,106,823 | B1* | 8/2021 | Brook | H04L 9/0891 |
| 11,297,459 | B2* | 4/2022 | Raduchel | H04W 4/02 |
| 11,301,483 | B2* | 4/2022 | Canel Lopez | G06F 16/25 |
| 11,431,682 | B2* | 8/2022 | Choudhury | H04L 41/5019 |
| 11,875,339 | B1* | 1/2024 | Bunn | G06Q 30/06 |
| 2008/0005264 | A1* | 1/2008 | Brunell | H04L 63/0407 709/217 |
| 2008/0040151 | A1* | 2/2008 | Moore | G16H 40/67 705/2 |
| 2010/0114920 | A1* | 5/2010 | Srivastava | G06F 21/6254 707/E17.014 |
| 2011/0161150 | A1* | 6/2011 | Steffens | G06Q 30/0224 705/14.28 |
| 2013/0325579 | A1* | 12/2013 | Salmon | G06Q 30/0228 705/14.29 |
| 2015/0278545 | A1* | 10/2015 | Bigras | G06F 21/44 726/26 |
| 2016/0050205 | A1* | 2/2016 | Heller | H04L 63/10 726/4 |
| 2016/0227438 | A1* | 8/2016 | Bhanage | H04L 43/0882 |
| 2016/0283745 | A1* | 9/2016 | LaFever | G06F 21/6218 |
| 2016/0321610 | A1* | 11/2016 | Stein | G06Q 20/4014 |
| 2016/0350481 | A1* | 12/2016 | Wesemann | G16H 10/60 |
| 2017/0124336 | A1* | 5/2017 | Freudiger | H04L 63/105 |
| 2018/0165702 | A1* | 6/2018 | Ariff | B01J 23/6562 |
| 2019/0335326 | A1* | 10/2019 | Al-Kabra | H04W 24/08 |
| 2021/0126784 | A1* | 4/2021 | Luce | H04L 9/14 |
| 2021/0150269 | A1* | 5/2021 | Choudhury | G06V 30/1985 |
| 2021/0182418 | A1* | 6/2021 | Oqaily | H04L 63/0414 |
| 2021/0210160 | A1* | 7/2021 | Shelton | G16B 20/20 |
| 2021/0336938 | A1* | 10/2021 | Karabatis | H04L 63/1475 |
| 2022/0050921 | A1* | 2/2022 | LaFever | H04L 63/20 |
| 2022/0131699 | A1* | 4/2022 | Kimmel | H04L 63/0861 |
| 2023/0054446 | A1* | 2/2023 | LaFever | H04W 12/75 |
| 2023/0134781 | A1* | 5/2023 | Senerth | G06F 21/6245 726/26 |
| 2023/0267229 | A1* | 8/2023 | Shea | G06F 21/6254 726/30 |
| 2023/0316322 | A1* | 10/2023 | Ammatanda | G06Q 30/0227 705/14.28 |

OTHER PUBLICATIONS

"U.S. Appl. No. 17/711,283, Response filed Jul. 24, 2023 to Final Office Action mailed Jun. 2, 2023", 16 pgs.

"U.S. Appl. No. 17/711,283, Advisory Action mailed Aug. 15, 2023", 3 pgs.

"U.S. Appl. No. 17/711,283, Response filed Sep. 5, 2023 to Advisory Action mailed Aug. 15, 2023", 16 pgs.

"U.S. Appl. No. 17/711,283, Examiner Interview Summary mailed Sep. 11, 2023", 2 pgs.

"U.S. Appl. No. 17/711,283, Notice of Allowance mailed Oct. 2, 2023", 12 pgs.

"U.S. Appl. No. 17/711,283, Non Final Office Action mailed Sep. 2, 2022", 13 pgs.

"U.S. Appl. No. 17/711,283, Non Final Office Action mailed Jan. 12, 2023", 15 pgs.

"U.S. Appl. No. 17/711,283, Response filed Feb. 16, 2023 to Non Final Office Action mailed Jan. 12, 2023", 17 pgs.

"U.S. Appl. No. 17/711,283, Response filed Oct. 28, 2022 to Non Final Office Action mailed Sep. 2, 2022", 18 pgs.

* cited by examiner

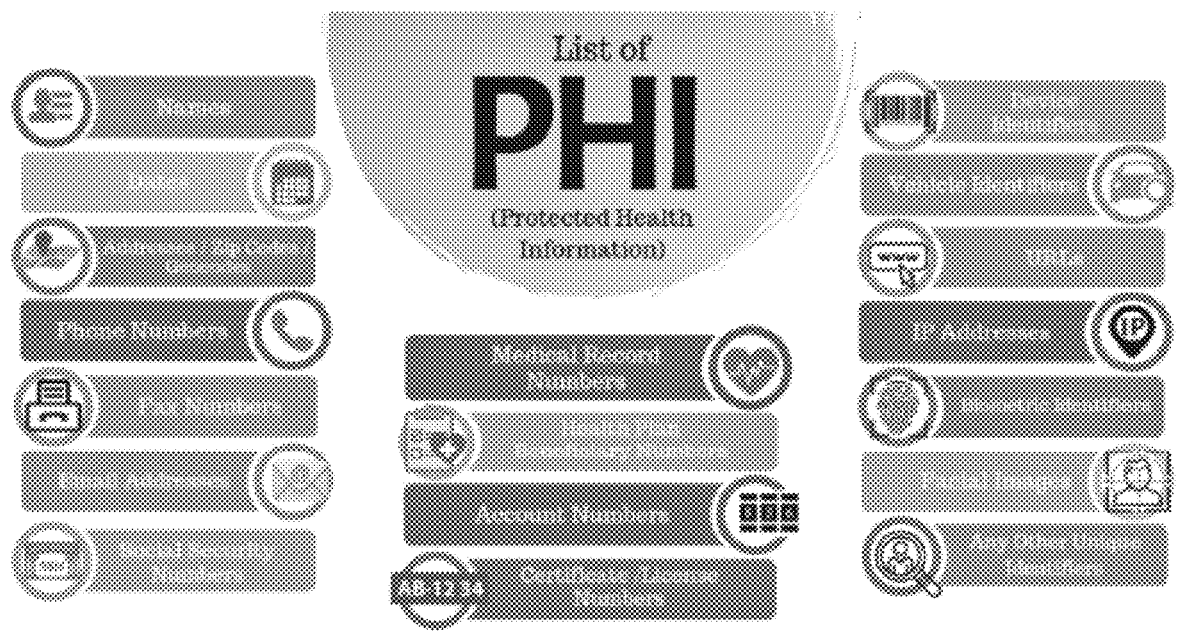

FIG. 4

Technical Guidelines for PCI Data Storage

| | Data Element | Storage Permitted | Protection Required | PCI DSS Req. 3.4 |
|---|---|---|---|---|
| Cardholder Data | Primary Account Number (PAN) | Yes | Yes | Yes |
| | Cardholder Name[a] | Yes | Yes[a] | No |
| | Service Code[a] | Yes | Yes[a] | No |
| | Expiration Date[a] | Yes | Yes[a] | No |
| Sensitive Authentication Data[a] | Full Magnetic Stripe Data[a] | No | N/A | N/A |
| | CAV2/CVC2/CVV2/CID | No | N/A | N/A |
| | PIN/PIN Block | No | N/A | N/A |

DATA AGGREGATION AND ANONYMIZATION IN MULTI-TENANT NETWORKS

TECHNICAL FIELD

This application relates to data aggregation and anonymization in multi-tenant environments or networks and, in some examples, to a data aggregator and anonymizer that can encrypt sensitive data received from multiple tenants as data sources. The sensitive data may include Personally Identifiable Information (PII), Protected Health Information (PHI) and Payment Card Industry (PCI) information. In some examples, anonymized data can be aggregated for multi-faceted testing without disclosing sensitive aspects. In some examples, the aggregated data can be selectively unencrypted to a given tenant.

BACKGROUND

Results derived from an analysis of "big data" can generally be improved if the volume of test data is significant. Typically, the larger the volume of test data, the more accurate an analysis of it will be. For example, there is greater chance to identify data outliers and trends in a significant body of data. Data aggregation, however, is not easy. It may be aggregated from different sources, but each source will likely have different methods of data protection with which to comply. Each source will also very often have different data content and configuration, and this may conflict with data configuration of other sources. This aggregation of disparate sources of protected information presents technical challenges, particularly in a multi-tenant networks or environments. The more data that is collected, the more complicated the security protocols become and the greater the risk of inadvertent disclosure or malicious access to it. Great care is required not to disclose encrypted information to third-party sources of aggregated data, or third-party "big data" analyzers scrutinizing collected data for discernible trends or machine-learning purposes, for example.

BRIEF DESCRIPTION OF THE SEVERAL VIEWS OF THE DRAWINGS

FIG. 4 illustrates multiple aspects of PHI, according to some examples.

FIG. 5 illustrates technical guidelines for PCI data storage, according to some examples.

FIG. 8 illustrates a control table, according to an example.

FIG. 9 illustrates an encrypt sensitive data control table, according to an example.

DETAILED DESCRIPTION

According to some example embodiments, techniques and systems are provided for data aggregation and anonymization in multi-tenant networks or environments. In some examples, a data aggregator and anonymizer platform can encrypt sensitive data received from multiple tenants as data sources. The sensitive data may include PII, PHI and PCI information. In some examples, anonymized data can be aggregated for multi-faceted testing without disclosing sensitive aspects. In some examples, a portion of the aggregated data can be selectively unencrypted and returned or presented to a tenant that was the original source or keeper of that portion of the aggregated data. The remainder of the portions are not unencrypted and may continue to form part of a body of test data.

Figure 3:
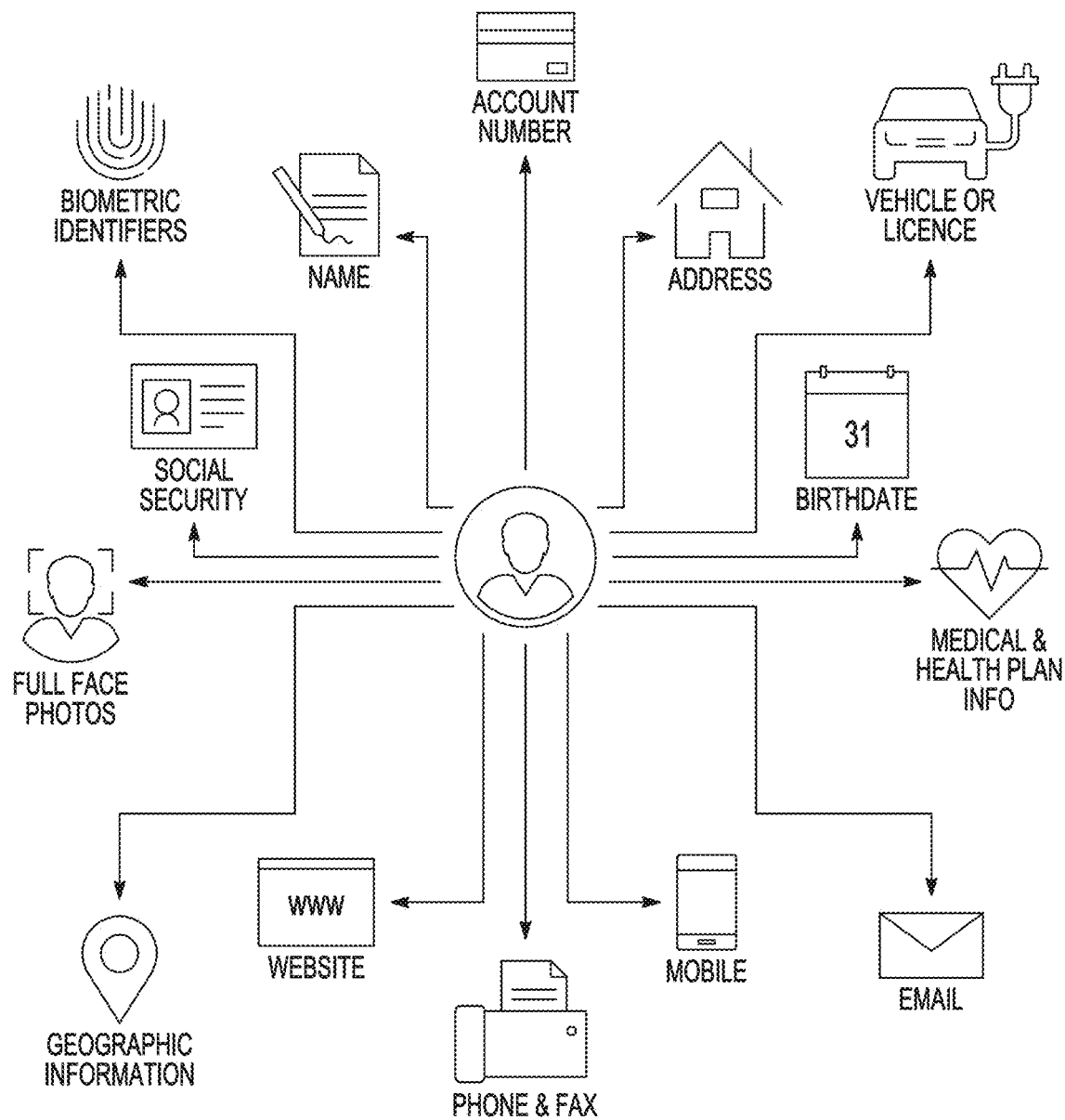
FIG. 3 illustrates multiple examples of PII, according to some examples.

FIG. 3 is a diagram showing multiple examples of PII. According to NIST 800-122, PII is any information about an individual maintained by an agency, including any information that can be used to distinguish or trace an individual's identity, such as name, social security number, date and place of birth, mother's maiden name, or biometric records, and any other information that is linked or linkable to an individual, such as medical, educational, financial, and employment information.

FIG. 4. is a diagram showing multiple examples of PHI. HIPAA Privacy Rules define PHI as "Individually identifiable health information, held or maintained by a covered entity or its business associates acting for the covered entity, that is transmitted or maintained in any form or medium (including the individually identifiable health information of non-U.S. citizens)." HIPAA Privacy Rule also stresses genetic information as health information.

FIG. 5 is a table indicating technical guidelines for PCI data storage. PCI compliance is mandated by credit card companies to help ensure the security of credit card transactions in the payments industry. Payment card industry compliance refers to the technical and operational standards that businesses follow to secure and protect credit card data provided by cardholders and transmitted through card processing transactions. PCI standards for compliance are developed and managed by the PCI Security Standards Council. The data elements relating to card holder name, service code, and expiration date must be protected if stored in conjunction with the Primary Account Number (PAN). This protection should be per PCI Data Security Standard (DSS) requirements for general protection of the cardholder data environment. Additionally, other legislation (e.g., related to consumer personal data protection, privacy, identity theft, or data security) may require specific protection of this data or proper disclosure of a company's practices if consumer related personal data is being collected during the course of business. PCI DSS, however, does not apply if PANs are not stored, processed, or transmitted. The sensitive authentication data must not be stored after authorization, even if encrypted. The Full Magnetic Swipe Data includes full track data from a magnetic stripe, magnetic stripe image on a chip, or elsewhere.

Fundamental problems that may arise when processing data in a strict compliance or regulated environment, involving PPI, PHI, or PCI for example, can occur at a confluence of healthcare and treatment information records. One challenge includes simulating a set of problems in production data, using test data. For a single medical practice, for example, subscribing along with other medical practices (tenants) to a subscription service (for example) in a multi-tenant network, using a small set of test data based on its own production data may limit the body of test data that can be assembled. On the other hand, trying to build a bigger set of test data by incorporating data from other tenants accessible in the multi-tenant network runs a serious risk of privacy invasion and breach of compliance laws. Further, a desire to collect a large body of data for testing and analysis may include sourcing data that is external to the multi-tenant network and may involve the participation of third parties to analyze the data (e.g., "big data" analysis). Thus, data protection laws prevent a mere aggregation of production data for test purposes.

In other aspects, a further challenge is to simulate realistically, in test environments, what is really happening in production environments. It is difficult to obtain a representative sample of test data that actually and realistically reflects production conditions of whatever aspect the tenant may be developing (for example, an updated health service to patients, a new product offering, or an enhanced online functionality).

In further challenging aspects, production and test systems usually have layers. Lower layers can be accessed by many people, while higher layers can be accessed by relatively few. Access and security protocols differ across layers. In a regulated environment, one cannot easily bring down test information into lower layers because this may violate one or more compliance laws since wider access to this information is provided.

In order to address these and other challenges, some present examples, at a high level, classify and encrypt test information, in particular sensitive information contained in the test information before it is brought down to lower layers. A representative sample of anonymized test data is made available for testing and, in some examples, is configurable based on data fields that might remain or are encrypted, among other factors. Once the encrypted information is brought down to lower layers, the anonymized test data may be used for a variety of testing purposes during development of a service or product, as discussed above.

Some present examples aggregate data to create a body of test data. The aggregated data may include data sourced from sources other than a single tenant (in other words, an aggregation of multi-tenant or multi-party data). For testing purposes, data analysis, or machine training purposes, an enhanced body of test data may be useful to a tenant or third-party data analyzer even though not all of the aggregated data may have been sourced from it. In this situation, a complicated cross-matrix of protection protocols such a PII, PHI, and PCI may apply, and each tenant may be entitled only to view the portion of the data that it supplied (or at least view an unencrypted version of that data). Present examples of a data aggregator and anonymizer platform facilitate the creation and access to such combined test data, yet still allow and greatly facilitate compliance with data protection laws in doing so.

In cloud-based and other modern systems (e.g., Software-as-a-Service (SaaS) platforms and so forth), most enterprises rely very heavily on third-party applications to process data. Some of these applications may include "big data" processing systems. The enterprise cannot physically control what these third parties do with their data. While inter-party agreements restricting data access and publication may be established, there is always a possibility of a rogue actor acting outside the agreed terms. A rogue actor at one tenant in a multi-tenant network might use network credentials to access another tenant to look up prohibited data. The accessed data might be used for exploitation or ransomware purposes, for example.

Thus, in some present examples, a data aggregator and anonymizer can aggregate and provide anonymized data that, even if accessed by a rogue actor, does not contain any identifying information. In some examples, a data encryption key is used to encrypt test data. In some examples, a decryption key to unlock test data is destroyed. In some examples, a decryption key to unlock a portion of aggregated test data is provided only to the tenant supplying that portion. The decryption key disallows decryption of any other data. The tenant as a source of data is thus placed in the same (unencrypted) position it was before supplying a portion of data to be aggregated yet has enjoyed the benefit of results and analysis derived from a much larger body of test data sourced from many other, if not all, tenants in a multi-tenant network. The tenants are reassured that any contributed data that has been aggregated and shared with another tenant or third-party data analyzer has nevertheless remained encrypted for purposes such of testing, "big data" analysis, machine learning, and so forth.

Figure 1:
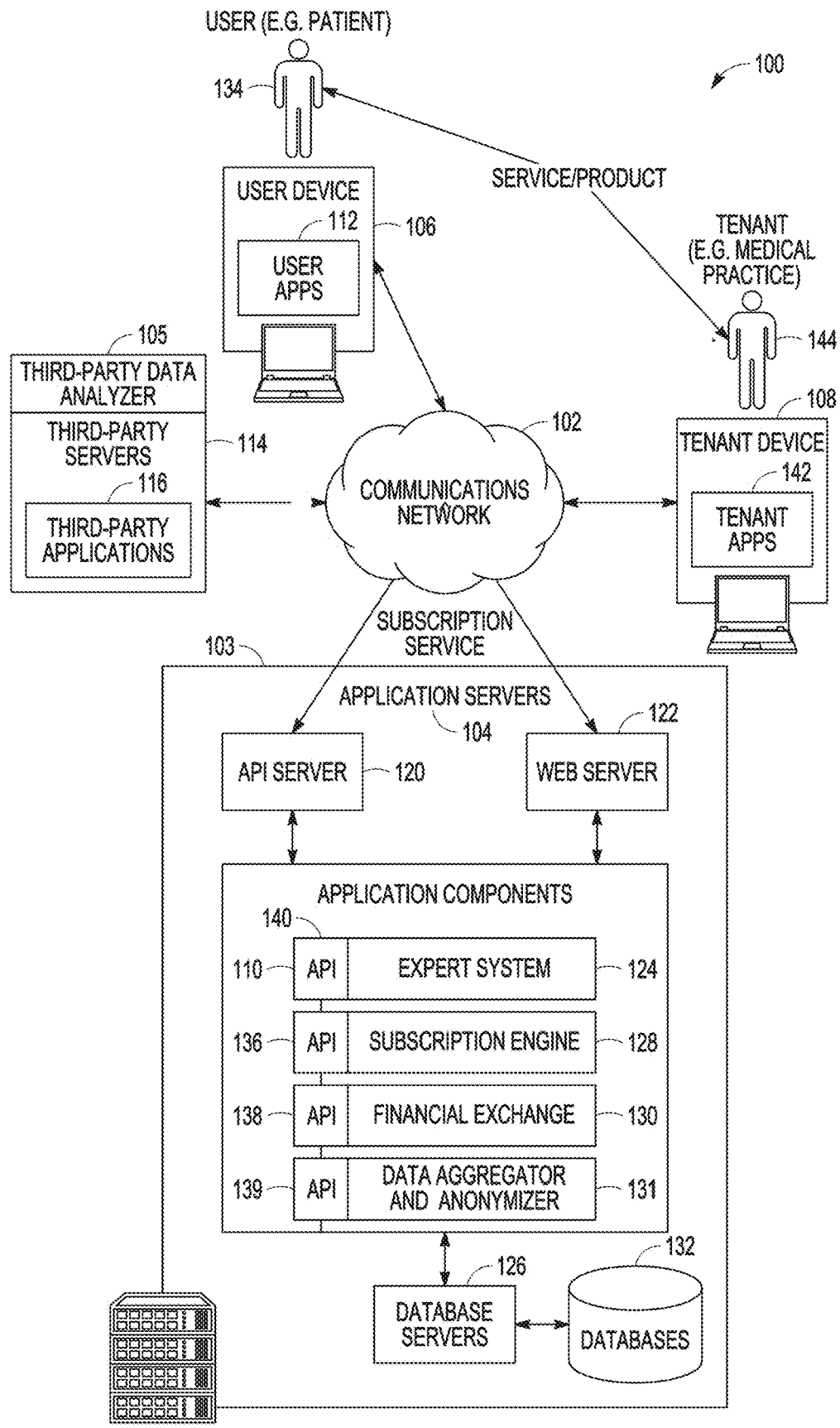
FIG. 1 illustrates a networked environment in which the described technology, according to some example embodiments, may be deployed.

FIG. 1 illustrates a networked multi-tenant network 100 in which a communications network 102 communicatively couples application servers 104 at a subscription service 103, a user device 106, a tenant device 108, and third-party servers 114. The third-party servers 114 may be accessed and operated by a third-party data analyzer 105 (e.g., a "big data" company), for example. The third-party servers 114 host third-party applications 116.

The user device 106 is accessed by a user 134 and processes operations and applications (e.g., a browser application, or commercial platform) sourced from or associated with a tenant 144. The tenant 144 may include a medical practice or service provider operating in a group of networked practices, for example. The user 134 may be a patient of the medical practice, for example. The tenant device 108 is accessed and operated by the tenant 144 to host and process tenant operations and applications 142. In some examples, the multi-tenant network includes a great multiplicity of tenants 144, each communicatively coupled with the subscription service 103.

The application servers 104 include an API server 120 and a web server 122 which, in turn, facilitate access to several application components 118 that include an expert system 124, a subscription engine 128, a financial exchange 130, and a data aggregator and anonymizer 131. Each of these components is provided with a respective API, namely an API 110, an API 136, an API 138, and an API 139.

The application components 118 are communicatively coupled to database servers 126 which in turn facilitate access to one or more databases 132.

In an example scenario, a tenant 144 (e.g., a medical practice) may wish to provide offerings (e.g., products or services) to a user 134 (e.g., a patient), either as a once-off/one-time delivery or as part of a subscription plan which has a recurrence. In this example, the medical practice 144 may also wish to provide the patient 134 with the option of paying for a health product or consultation as a once-off payment, as a subscription payment, or as a combination of a once off payment and a subscription payment.

At a high level, the expert system 124 operates to enable an expert in a particular vertical (e.g., the medical practice 144) to define and manage a plan for the delivery of various products and services to its patients 134. An expert system 124 is accordingly specifically constructed and programmed for the creation of a plan for the delivery of a specific product or service in a particular product or service vertical.

The subscription engine 128 is responsible for the automated management of a plan (which may or may not include any number of subscriptions to products or services).

The financial exchange 130 is responsible for communicating financing opportunities related to a plan to one or more financiers (e.g., who may operate as a provider, or who may be a third party accessing the financial exchange 130 via the third-party applications 116).

Figure 2:
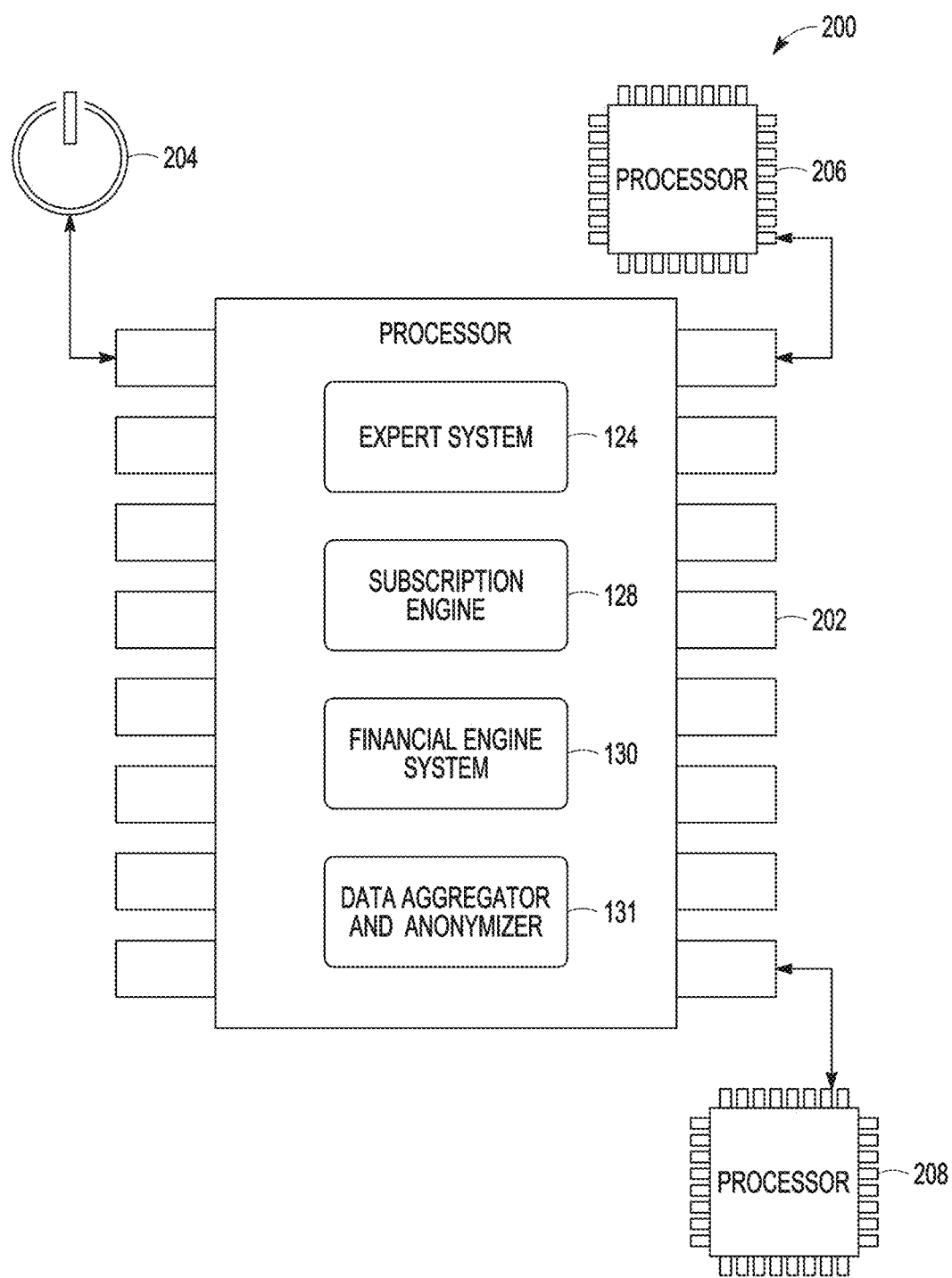
FIG. 2 is a diagrammatic representation of a processing environment, in accordance with one embodiment.

FIG. 2 is a diagrammatic representation of a processing environment 200, which includes a processor 206, a processor 208, and a processor 202 (e.g., a GPU, CPU, or combination thereof). The processor 202 is shown to be coupled to a power source 204, and to include (either permanently configured or temporarily instantiated) modules, namely the expert system 124, the subscription engine 128, the financial exchange 130, and the data aggregator and anonymizer 131. The expert system 124 operationally supports a guided process for the selection of products or services, as well as the attributes of such products and services (e.g., quantity (units), a frequency of delivery and number of deliveries), to include in a subscription.

The subscription engine 212 operationally calculates and presents information relating overall options related to a subscription for bundled purchase, and the financial exchange system 214 operationally allows third parties (e.g., lenders) to view financing opportunities and accept or reject such financing opportunities for subscriptions (or bundles of subscriptions) generated by the subscription engine 112.

As illustrated, the processor 202 is communicatively coupled to both the processor 206 and processor 208 and receives data from the processor 206, as well as data from the processor 208. Each of the processor 202, processor 206, and processor 208 may host one or more of an expert system 210, a subscription engine 212, a financial exchange system 214, and a data aggregator and anonymizer 131.

Figure 6:
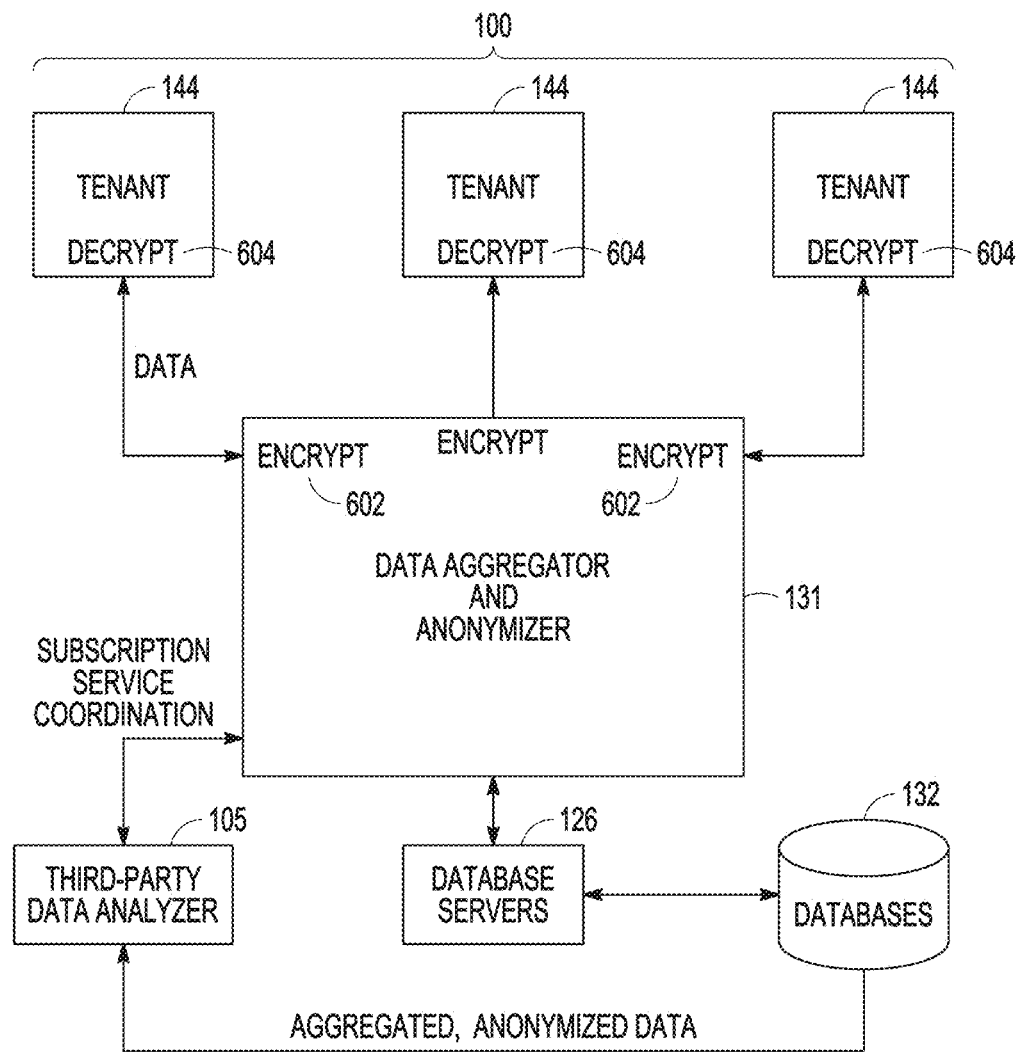
FIG. 6 illustrates a networked environment in which the described technology, according to some example embodiments, may be deployed.

With reference to FIG. 6, in some examples, a tenant 144 in a multi-tenant network 100 may wish to create a testing environment in which to develop a new product or service. To that end, in present examples, the tenant 144 can contact the subscription service 103 and request an aggregation of test data, or an analysis of a body of data to help in developing the product or service. The subscription service 103 invokes the data aggregator and anonymizer 131 shown in the view. The tenant 144 may contribute some data, such as production data, to be aggregated or anonymized for test purposes. Some of this production data may be covered by PII, PHI, or PCI requirements and will therefore require appropriate treatment before it can be analyzed by or shared with others. As described more fully below, the aggregated test data is classified to identify sensitive data and encrypted accordingly. The test data is aggregated by the data aggregator and anonymizer 131 to assist in simulating production conditions in which to test the tenant's proposed product or service. In some examples, a plurality of tenants 144 may request an analysis of their respective production data or a simulation of a real-life real-time production environment.

The data aggregated by the data aggregator and anonymizer 131 may be derived from a number of different data sources to assist in creating a realistic test environment or a rich body of data for analysis and training, for example. In some examples, the data may be sourced from a number of sources, without limitation. A data source may include, for example, a single tenant in a network, a plurality of tenants in a network, a single third party outside of a network, or a plurality of third parties outside of a network. Tenants or third parties may be sources of application data, web-based traffic data, or other types of data. Tenants and third parties may offer analysis tools and machine learning models, or other services.

Whether requested by a single tenant 144, or several tenants 144, the aggregated data may comprise a complicated cross-matrix of protection protocols such as PII, PHI, and PCI. Each tenant 144 may be entitled only to view a portion of the data that it supplied or, if permitted, an unencrypted version of that data.

In some examples, data sent by a tenant or accessed by the data aggregator and anonymizer 131 is encrypted at 602 upon receipt or a grant of access. In some examples, when test data, or analyzed data results, are sent back to a tenant 144, this portion of the data is decrypted at 604. These processes are described more fully below. The aggregated and anonymized data is stored in a database, such as the one or more databases 132 described above. Present examples of a data aggregator and anonymizer 131 facilitate the creation and access to combined test data, yet still allow and greatly facilitate compliance with data protection laws in so doing.

In some examples, one or more third-party data analyzers 105 may request access to the aggregated and anonymized data stored in the database 132 for purposes of analyzing it to support the tenant's product or service development mentioned above. A third-party data analyzer 105 may be contracted by the subscription service 103, or a tenant 144, to perform data analysis. With appropriate authorization, the data analyzer 105 may be granted access to the data stored in the database 132. To the extent any access is granted, or to the extent a rogue actor may be at work, the aggregated data stored in the database 132 remains anonymized and yields no sensitive information. The data stored in the database 132 may be safely used by the data analyzer 105, or a tenant 144, or the data aggregator and anonymizer 131, in a number of ways including, for example, data analysis, the development of models for machine learning, and for other purposes.

Figure 7:
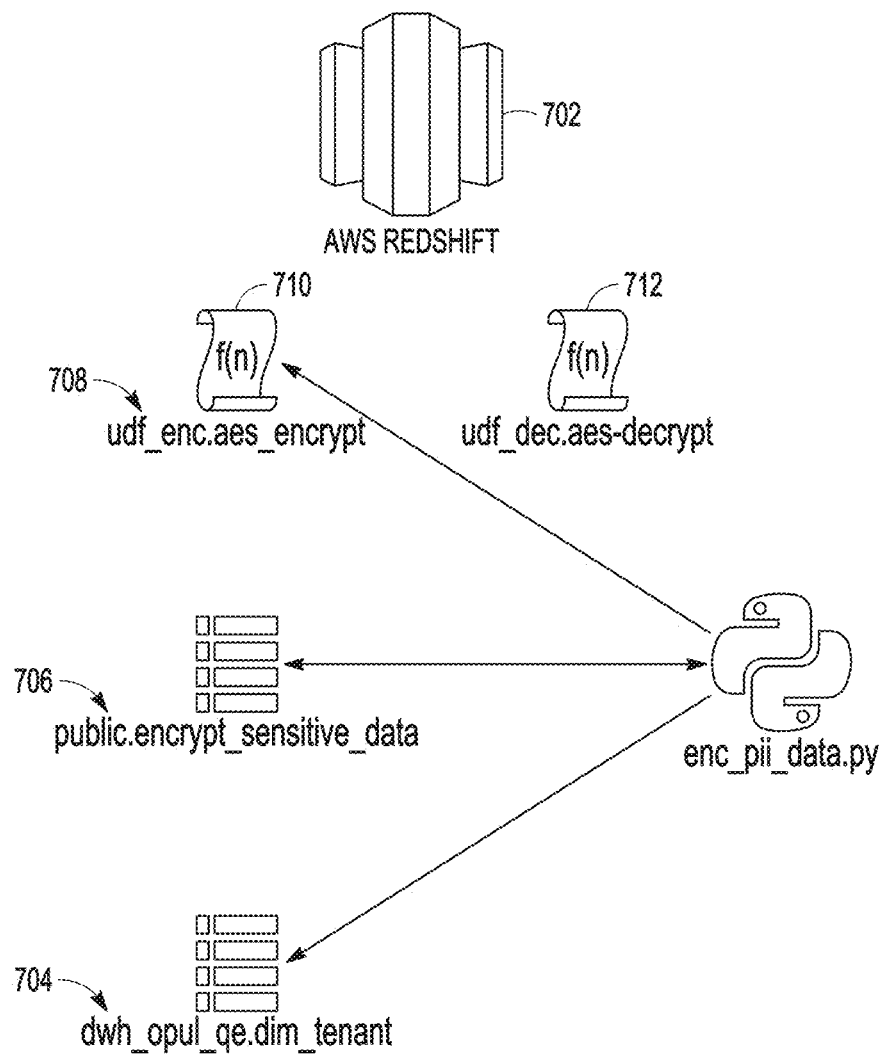
FIG. 7 is a schematic diagram illustrating aspects of encryption, according to some examples.

With reference to FIG. 7, some examples, particularly those that utilize the cloud or cloud-based services, include layers, such as software, application, or storage layers, responsible for or utilized in certain aspects of data usage and processing from an origin to post-production. One aspect includes encryption. An example encryption can include an Advanced Encryption Standard (AES). AES follows a symmetric encryption algorithm, i.e., the same key is used to encrypt and decrypt the data. AES supports block lengths of 128, 192, and 256 bits. One example, in a data analytics or reporting tier, includes Amazon Web Services (AWS) Redshift 702 for encryption and decryption. Redshift is used in some examples to encrypt and decrypt data in various layers. Other encryption software is possible.

In some examples, an AES encryption level is specific to a database persistence layer, for example as shown in FIG. 7. At a first layer 704, stored data is sourced from one or more tenants 144 and aggregated. At layer 706, sensitive data in the aggregated data is identified and encrypted. These operations may occur at the data aggregator and anonymizer 131 using database 132, for example. Sensitive data is scrambled, hashed, or randomly keyed in some examples. At layer 708 (for example a lower, widely distributed later), data is encrypted at 710 so that it is rendered anonymous. Users operating in this lower level 708 have no access to sensitive data, or if access is obtained, the data is meaningless because it has been anonymized. The data can be decrypted at 712 as needed for authorized provision to a tenant seeking full access to their data. These encrypt/decrypt operations may occur at the data aggregator and anonymizer 131 or at a tenant 144, in some examples. The aggregated, anonymized data may be stored in database 132.

Figure 8:
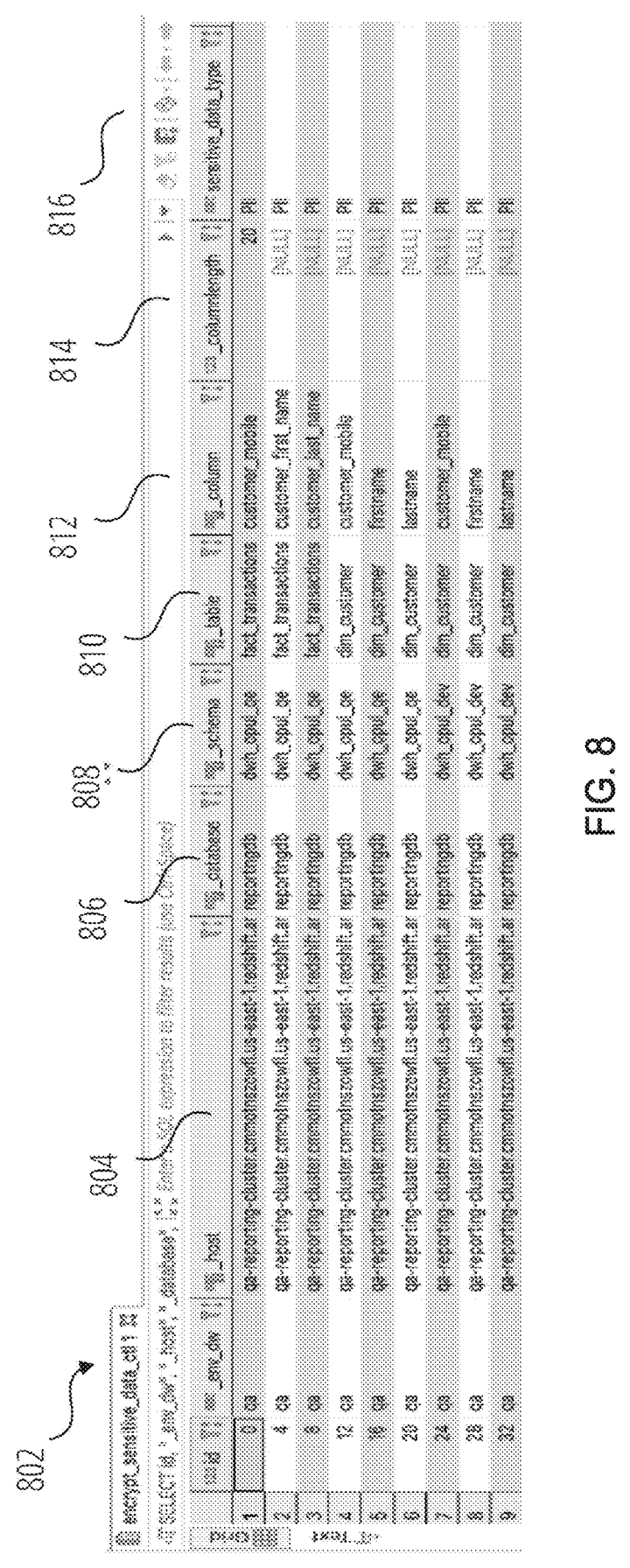

FIG. 8 shows an example of a control table 802. The table may form part of a data structure in one of the databases 132, for example. The control table 802 is used in operations including the identification, classification, encryption, and/or anonymization of sensitive data. The control table 802 may include metadata relating to sensitive and other data. For example, the control table 802 may include columns relating to one or more aspects of data. In some examples, this data is aggregated data collected from a number of tenants or third parties. Some aspects of the data may, or may not, relate to sensitive information of the type discussed above. Column 804 identifies a data host or source of data, column 806 identifies a database storing data, column 808 identifies a schema for data, column 810 identifies a data table for data, column 812 identifies a data column, column 814 identifies a column length, and column 816 identifies a sensitive data type. In the illustrated example, the sensitive data type includes PII. The control table 802 maps out, from a compliance point of view, how the various elements of the aggregated data should be treated, for example encrypted, permanently deleted, or otherwise anonymized on some manner.

FIG. 9 shows an example of an encrypt sensitive data control table 902. Some of the aspects of data shown in the control table 802 are again visible in the encrypt sensitive data control table 902 as host 904, database 906, schema 908 and so on. In particular, an identification of the sensitive PII data is again provided at 910. In the illustrated example, the encrypt sensitive data control data table 902 also provides details of an encryption of the sensitive data in the region marked 912 in the table. In this example, the encryption details include, in relation to sensitive data (such as PII, PHI, and PCI), whether the data is: ready for encryption, is encrypted, an encryption start (for example a date and/or time or time period), an encryption end (for example a date and/or time or time period), an encrypted row count, a code message, an encryption confirmation, an encryption audit performed by, an encryption audit performed on (for example a date and/or time or time period), an encryption audit comment, a data ready for transfer indication, a data inserted by, and a data inserted on indication. Other encryption details are possible.

Figure 10:
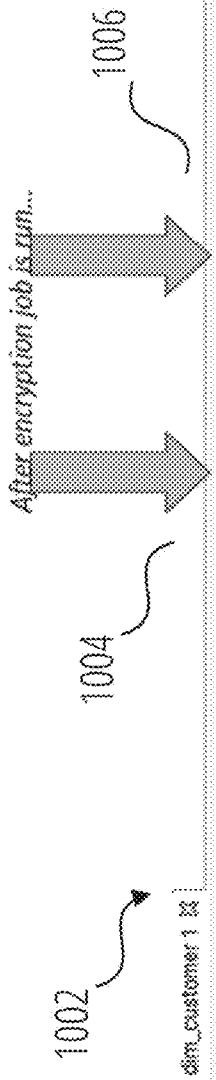
FIG. 10 illustrates example encryption results in tabular form, according to some examples.

FIG. 10 illustrates in tabular form example results after an encryption task is performed. In the encryption results table 1002, the table columns 1004 and 1006, indicating "firstname" and "lastname," have been fully encrypted. The identification of a patient's first name and last name fall within the ambit of PII compliance requirements yet have been completely anonymized. As shown, a degree of encryption or anonymity of a given first or last name can run from 6 to 16 meaningless characters. The encryption results table 1002 illustrates an ability of a data aggregator and anonymizer to aggregate complex data from a great number of disparate sources for test or analysis purposes, yet render anonymous any sensitive information, such as PII, PHI, and PCI. In some examples, this rich collection of anonymous data allows a realistic simulation of production environments in which to test a new product, service, or online functionality, for example. The rich body of data may be used in these regards by one or more of the tenants 144, a third-party data analyzer 105, and the data aggregator and anonymizer 131, for example. Other users and uses of the data are possible.

Figure 11:
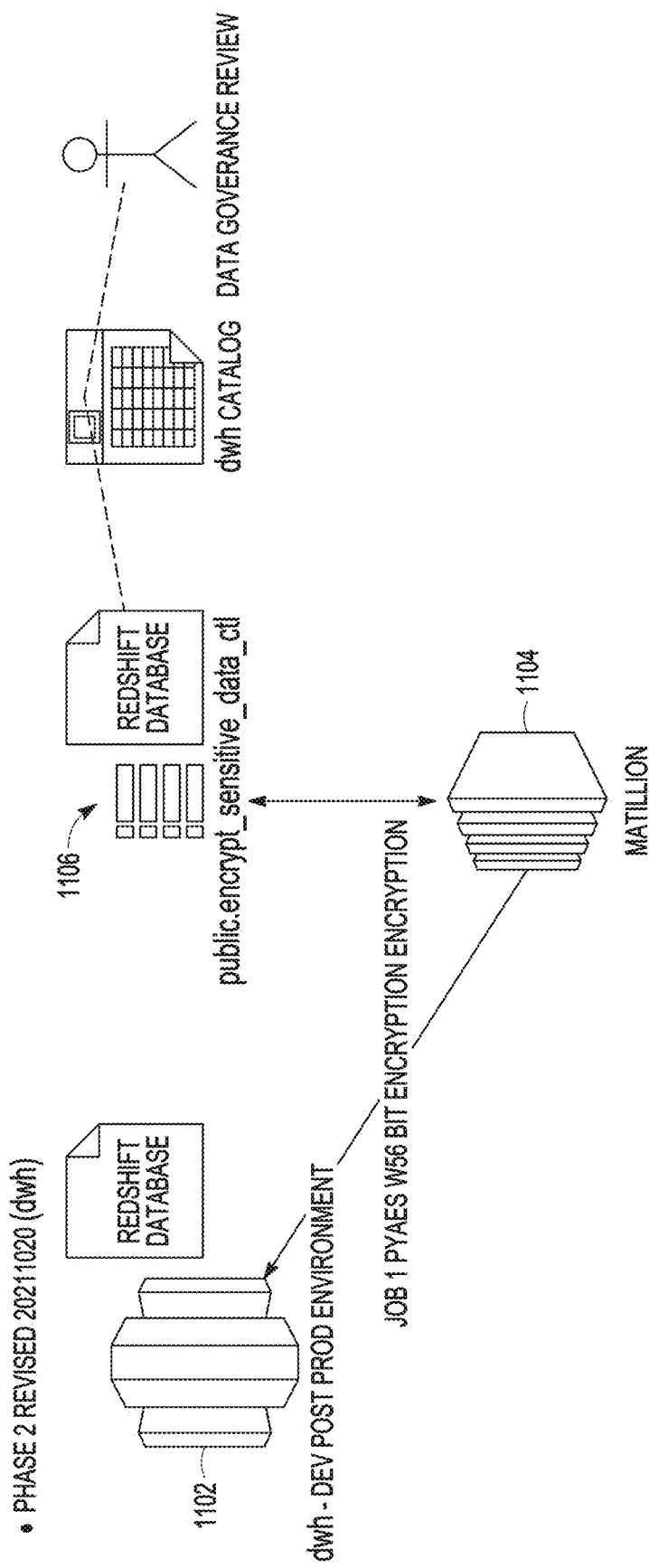
FIG. 11 illustrates data production structures, according to some examples.

With reference to FIG. 11, further examples of data production structures are shown. Aggregated data may be stored in a data warehouse 1102. An encryption engine 1104, in this case running on Matillion software, classifies and encrypts identified layers of sensitive data at 1106. This encryption is performed directly on data structures at relatively high levels of data residing closer to production systems, instead of relatively lower levels. This provides a shortcut, as it were, enabling an encryption of data before it is transported or used at lower levels.

Figure 12:
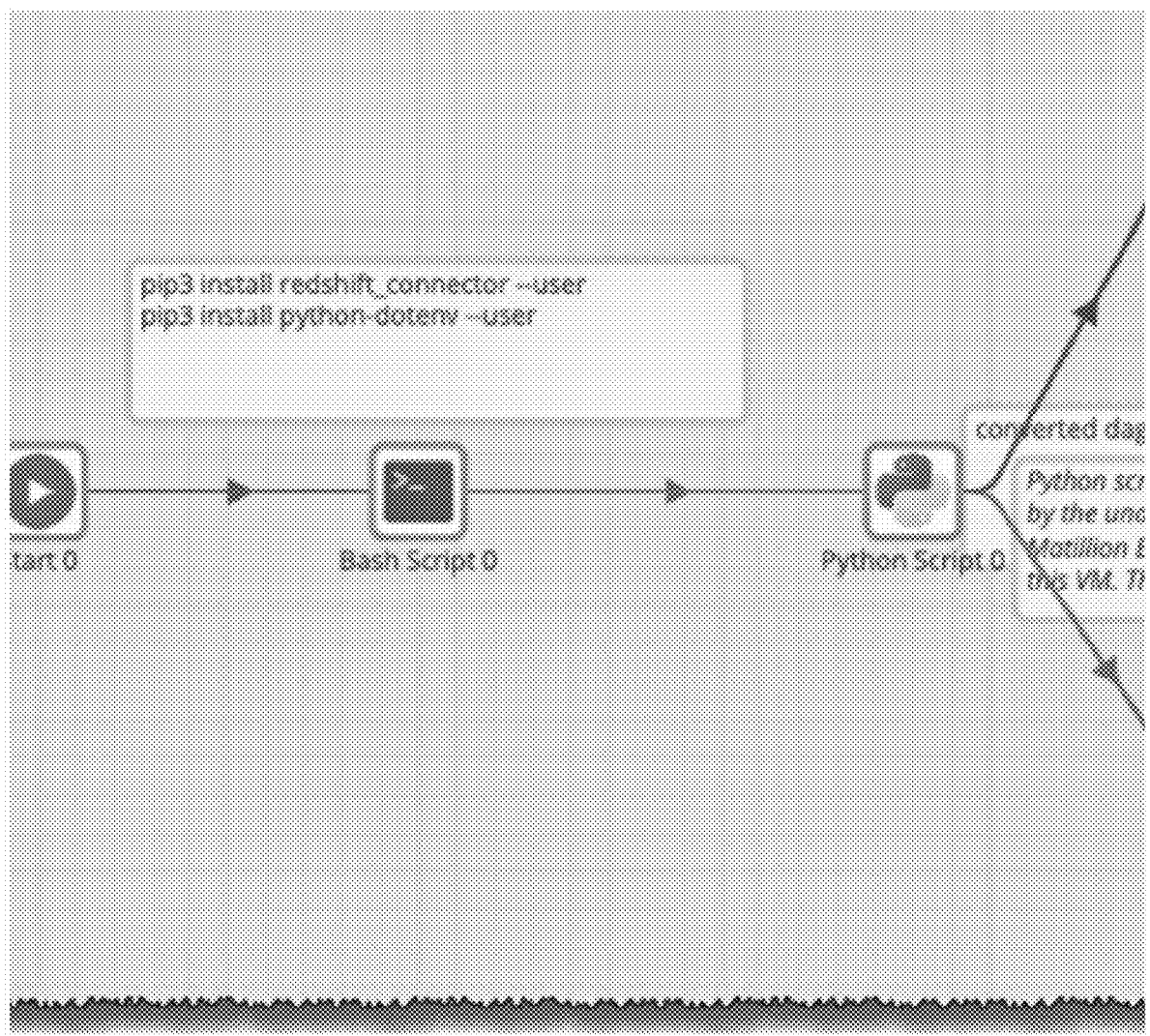
FIGS. 12-13 illustrate operations in data encryption procedures, according to some examples.
Figure 13:
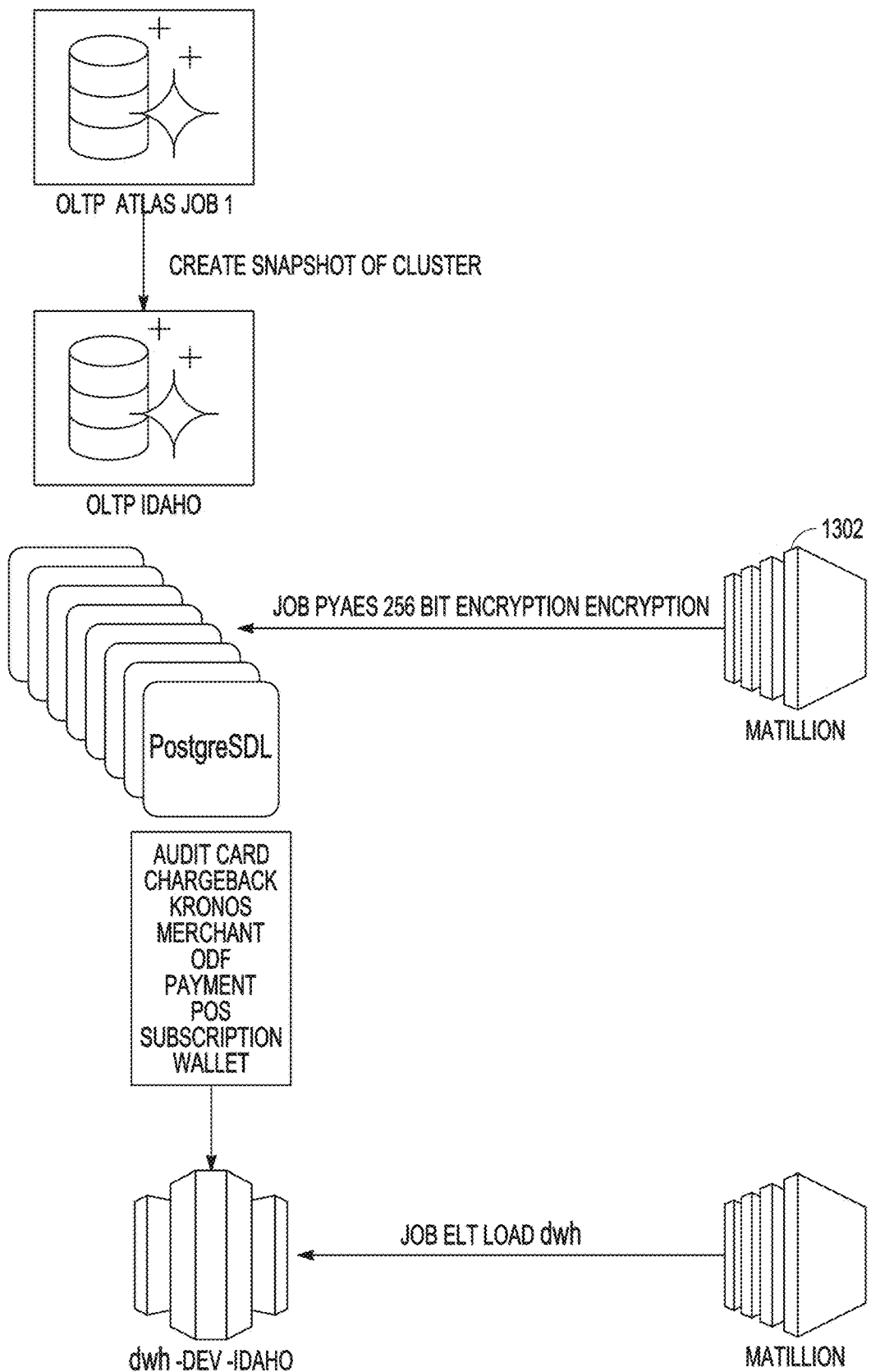

FIGS. 12-13 illustrate example procedures in this regard. FIG. 12 illustrates example operations in a Matillion-based orchestration job hand-written in a Python computer software development language illustrated at 1104 (FIG. 11) and at 1302 in FIG. 13 as Matillion JOB PYEAS 256-bit encryption. FIG. 13 further illustrates a capability of the Matillion orchestration job hand-written in a Python computer software development language in that it can apply the encryption based on the instructions in the control table directly on the OLTP data stores in PostgreSQL. It also has the capability of applying encryption directly on the OLAP Datawarehouse tables in Redshift data stores.

Some third-party data analyzers 105 are highly specialized in the data analysis functions they perform and solutions they can provide. It may be that a tenant 144 or the subscription service 103 is unable to engineer similar solutions. If tenant data is supplied to the third-party data analyzer by the subscription service and the third-party is hacked, this can cause a very problematic situation. The tenant has lost valuable and sensitive information, very likely incurred liability and losing credibility with its patients. In the current era, identify theft is unfortunately on the increase. In the event of a data breach, the subscription service will very likely be exposed to privacy invasion claims and damage, especially if it did not exercise a duty of care and take reasonable steps to protect the information. IN some instances, prior attempts that seek to counter this threat have included encrypting "everything". But wholly encrypted data loses its richness and meaning for test purposes. Much of the value of aggregated data is lost. Simulated production data loses a significant degree of realism.

Thus, examples of the present disclosure employ a different approach and do not encrypt "everything". Examples enable a full test experience while protecting only that which needs to be protected. Data is still represented in a way that third parties can consume it and add their value. Data is not obfuscated so much that third parties cannot use it. Meaningful big data processing, aggregations, transformations, and similar operations can still take place without disclosure of sensitive information. Many, if not all, layers of anonymized data can safely be invoked. When analysis results are generated, a subscription service 103 can identify appropriate pieces of data and selectively decrypt them to reconstitute the original data that was sourced from a tenant and render and return unencrypted results in a meaningful way.

Partial encryption, as opposed to full encryption, can present special technical challenges where sensitive data is mixed in with other data and the sources of data are all different in terms of content and configuration. Example solutions for these problems are discussed above, and while technically challenging to implement, they offer a smooth user experience. In some instances, the only change a user (e.g., a tenant 144 or data analyzer 105) might experience differently in a test session is an anonymity in some data. User interfaces (UIs) and databases will still operate in the same way as in real-life production, but sensitive data has been securely encrypted or anonymized. Existing APIs will still work. Moreover, in some examples, access to protected test data is facilitated. For example, a third-party analyzer 105 engaged by a tenant 144 to conduct data analysis and testing can access APIs exposed by the subscription service 103 to pull aggregated encrypted data for testing and analysis. The data may be requested via a UI instructing the data aggregator and anonymizer 131 and retrieved from the databases 132. After processing, portions of the data may be returned to the tenant and decrypted on presentation.

Thus, in some examples, there is provided a data aggregator and anonymizer for selective encryption of test data, the data aggregator and anonymizer comprising: a processor; and a memory storing instructions that, when executed by the processor, configure the data aggregator and anonymizer to perform operations including: receiving first order data from a first data source, the first order data including a mix of sensitive and non-sensitive information, the sensitive information including one or more of Personally Identifiable Information (PII), Protected Health Information (PHI) and Payment Card Industry (PCI) information; receiving second order data from a second data source, the second order data including a different mix of sensitive and non-sensitive information, the sensitive information including one or more of PII, PHI, and PCI information; combining and storing the first and second order data into an aggregated data structure, the aggregated data structure including layers in which stored data resides; identifying the sensitive information; encrypting identified sensitive information stored in at least one layer of the aggregated data structure to create an anonymous body of test data; storing the anonymous body of test data in a database; and providing access to the anonymous body of test data to the first or second data source or a third-party data analyzer.

In some examples, encrypting the identified sensitive information includes applying an encryption to a first layer of the aggregated data structure, rendering sensitive data included in the first layer anonymous.

In some examples, the first layer of the aggregated data structure is lower than a higher second layer in the aggregated data structure; and a user access to the lower first layer is wider than user access to the higher second layer.

In some examples, sensitive data residing in the second layer in the aggregated data structure is not encrypted in the second layer and user access thereto is unrestricted.

In some examples, the operations further comprise decrypting a processed portion of the anonymous body of test data when delivering or presenting the processed portion to one of the first and second data sources.

In some examples, the first and second data sources are first and second tenants in a multitenant network; and the data aggregator and anonymizer resides at a subscription service to which the first and second tenants subscribe.

Figure 14:
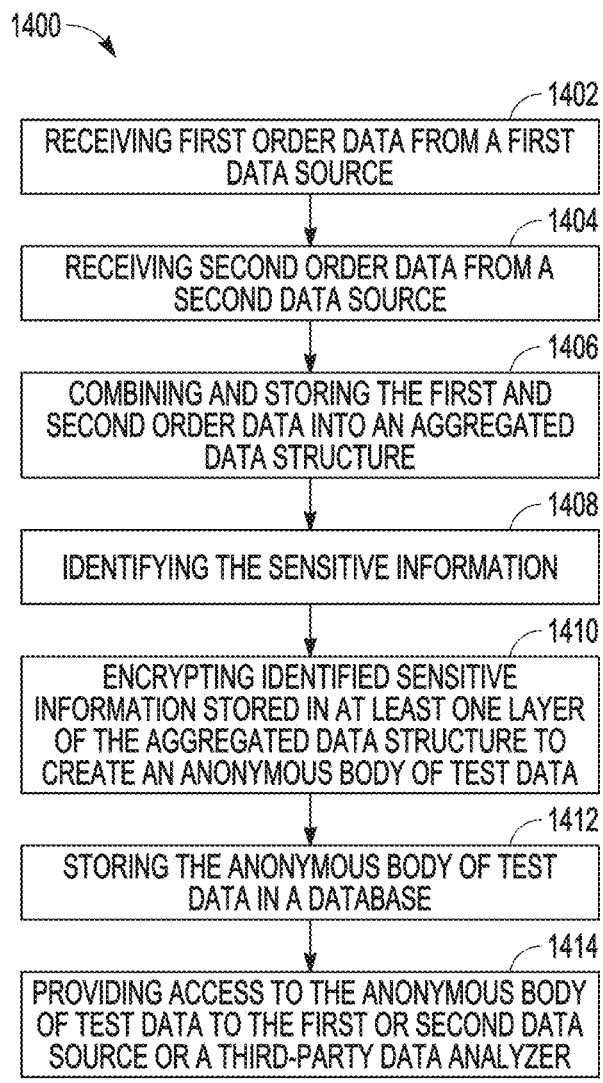
FIG. 14 is a flow chart showing example operations in a method, according to an example.

Disclosed embodiments also include methods. With reference to FIG. 14, example operations in a method 1400 of data aggregation and anonymization for selective encryption of test data includes, at operation 1402, receiving first order data from a first data source, the first order data including a mix of sensitive and non-sensitive information, the sensitive information including one or more of Personally Identifiable Information (PII), Protected Health Information (PHI) and Payment Card Industry (PCI) information; at operation 1404, receiving second order data from a second data source, the second order data including a different mix of sensitive and non-sensitive information, the sensitive information including one or more of PII, PHI, and PCI information; at operation 1406, combining and storing the first and second order data into an aggregated data structure, the aggregated data structure including layers in which stored data resides; at operation 1408, identifying the sensitive information; at operation 1410, encrypting identified sensitive information stored in at least one layer of the aggregated data structure to create an anonymous body of test data; at operation 1412, storing the anonymous body of test data in a database; and, at operation 1414, providing access to the anonymous body of test data to the first or second data source or a third-party data analyzer.

In some examples, encrypting the identified sensitive information includes applying an encryption to a first layer of the aggregated data structure, rendering sensitive data included in the first layer anonymous.

In some examples, the first layer of the aggregated data structure is lower than a higher second layer in the aggregated data structure; and a user access to the lower first layer is wider than user access to the higher second layer.

In some examples, sensitive data residing in the second layer in the aggregated data structure is not encrypted in the second layer and user access thereto is unrestricted.

In some examples, the method 1400 further comprises decrypting a processed portion of the anonymous body of test data when delivering or presenting the processed portion to one of the first and second data sources.

In some examples, the first and second data sources are first and second tenants in a multitenant network; and the data aggregator and anonymizer resides at a subscription service to which the first and second tenants subscribe.

Some examples include a non-transitory, machine-readable medium including instructions which, when read by a machine, cause the machine to perform operations comprising at least those summarized above, or described elsewhere herein.

Figure 15:
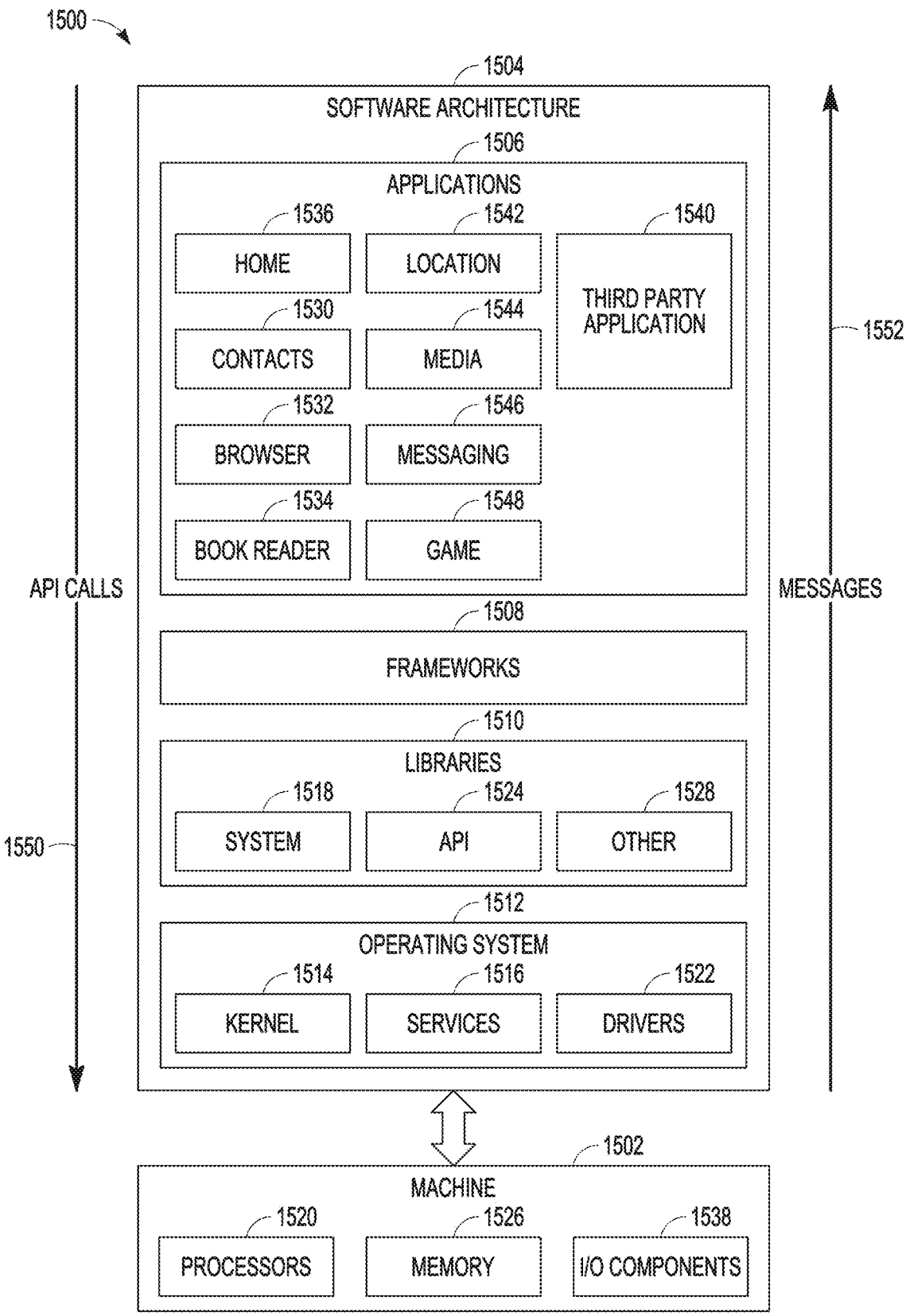
FIG. 15 illustrates a block diagram of a software architecture, according to some example embodiments.

FIG. 15 is a block diagram 1500 illustrating a software architecture 1504, which can be installed on any one or more of the devices herein. FIG. 15 is merely a non-limiting example of a software architecture, and it will be appreciated that many other architectures can be implemented to facilitate the functionality described herein. In various embodiments, the software architecture 1504 is implemented by hardware such as a machine 1502 of FIG. 15 that includes processors 1520, memory 1526, and input/output (I/O) components 1538. In this example architecture, the software can be conceptualized as a stack of layers where each layer may provide particular functionality. For example, the software includes layers such as an operating system 1512, libraries 1510, frameworks 1508, and applications 1506. Operationally, the applications 1506 invoke application programming interface (API) calls 1550 through the software stack and receive messages 1552 in response to the API calls 1550, consistent with some embodiments.

In various implementations, the operating system 1512 manages hardware resources and provides common services. The operating system 1512 includes, for example, a kernel 1514, services 1516, and drivers 1522. The kernel 1514 acts as an abstraction layer between the hardware and the other software layers, consistent with some embodiments. For example, the kernel 1514 provides memory management, processor management (e.g., scheduling), component management, networking, and security settings, among other functionalities. The services 1516 can provide other common services for the other software layers. The drivers 1522 are responsible for controlling or interfacing with the underlying hardware, according to some embodiments. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1510 provide a common low-level infrastructure utilized by the applications 1506. The libraries 1510 can include system libraries 1518 (e.g., C standard library) that can provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that can be utilized by the applications 1506, according to some embodiments. For example, the frameworks 1508 provide various graphical user interface (GUI) functions, high-level resource management, high-level location services, and so forth. The frameworks 1508 can provide a broad spectrum of other APIs that can be utilized by the applications 1506, some of which may be specific to a particular operating system or platform.

In an example embodiment, the applications 1506 include a home application 1536, a contacts application 1530, a browser application 1532, a book reader application 1534, a location application 1542, a media application 1544, a messaging application 1546, a game application 1548, and a broad assortment of other applications such as a third-party application 1540. According to some embodiments, the applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
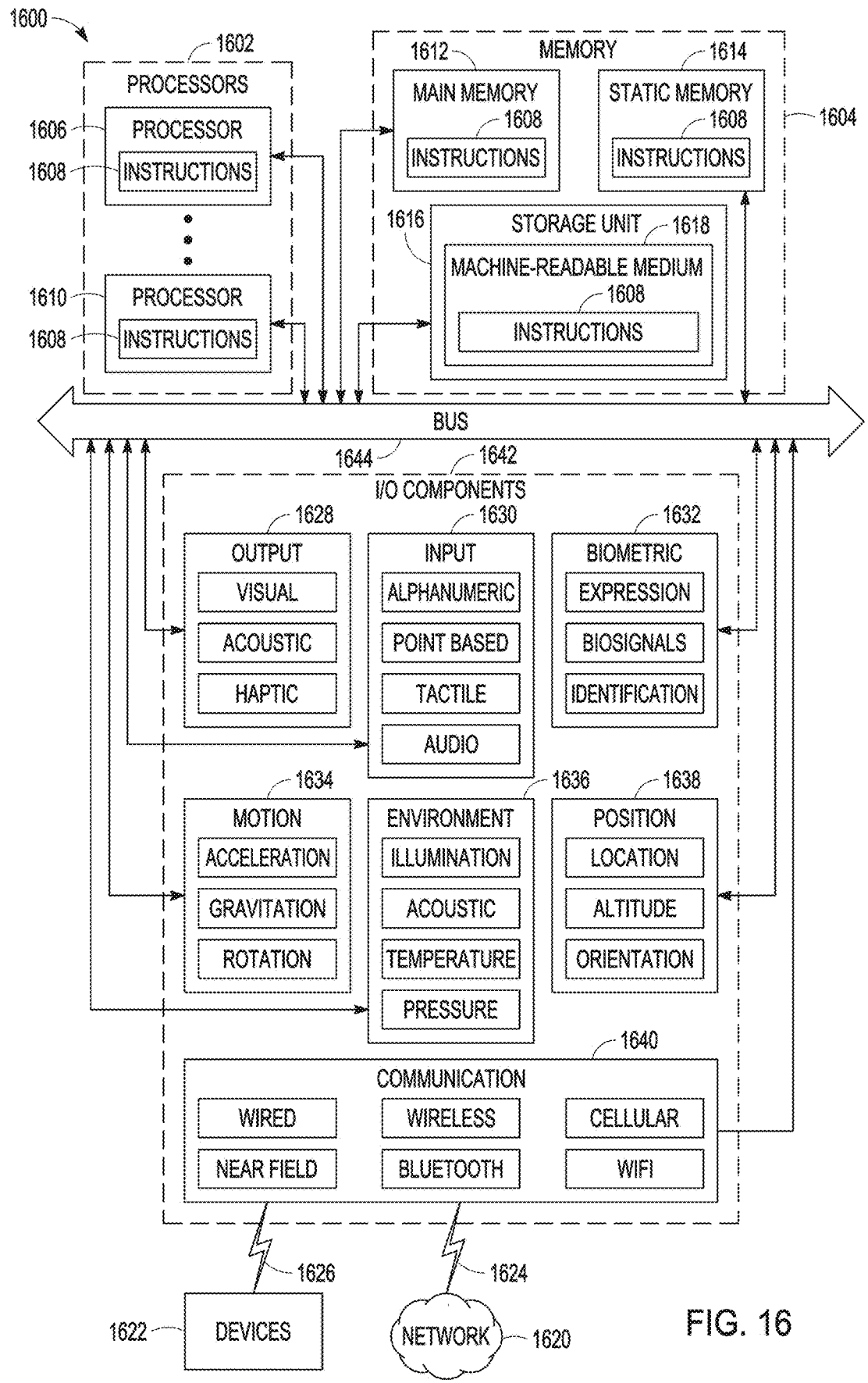
FIG. 16 illustrates a diagrammatic representation of a machine 1600 in the form of a computer system within which a set of instructions may be executed for causing the machine to perform any one or more of the methodologies discussed herein, according to an example embodiment.

FIG. 16 illustrates a diagrammatic representation of a machine 1600 in the form of a computer system within which a set of instructions may be executed for causing the machine to perform any one or more of the methodologies discussed herein, according to example embodiments. Specifically, FIG. 16 shows a diagrammatic representation of the machine 1600 in the example form of a computer system, within which instructions 1608 (e.g., software, a program, an application, an applet, an app, or other executable code) for causing the machine 1600 to perform any one or more of the methodologies discussed herein may be executed. The instructions 1608 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machine 1600 that individually or jointly execute the instructions 1608 to perform any one or more of the methodologies discussed herein.

The machine 1600 may include processors 1602, memory 1604, and I/O components 1642, which may be configured to communicate with each other such as via a bus 1644. In an example embodiment, the processors 1602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1606 and a processor 1610 that may execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single core, a single processor with multiple cores (e.g., a multi-core processor), multiple processors with a single core, multiple processors with multiples cores, or any combination thereof.

The memory 1604 may include a main memory 1612, a static memory 1614, and a storage unit 1616, both accessible to the processors 1602 such as via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602

(e.g., within the processor's cache memory), or any suitable combination thereof, during execution thereof by the machine 1600.

The I/O components 1642 may include a wide variety of components to receive input, provide output, produce output, transmit information, exchange information, capture measurements, and so on. The specific I/O components 1642 that are included in a particular machine will depend on the type of machine. For example, portable machines such as mobile phones will likely include a touch input device or other such input mechanisms, while a headless server machine will likely not include such a touch input device. It will be appreciated that the I/O components 1642 may include many other components that are not shown in FIG. 16. The I/O components 1642 are grouped according to functionality merely for simplifying the following discussion, and the grouping is in no way limiting. In various example embodiments, the I/O components 1642 may include output components 1628 and input components 1630. The output components 1628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1642 may include biometric components 1632, motion components 1634, environmental components 1636, or position components 1638, among a wide array of other components. For example, the biometric components 1632 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 may include acceleration sensor components (e.g., accelerometer), gravitation sensor components, rotation sensor components (e.g., gyroscope), and so forth. The environmental components 1636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1642 may include communication components 1640 operable to couple the machine 1600 to a network 1620 or devices 1622 via a coupling 1624 and a coupling 1626, respectively. For example, the communication components 1640 may include a network interface component or another suitable device to interface with the network 1620. In further examples, the communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1622 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional barcodes such as Universal Product Code (UPC) barcode, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

The various memories (i.e., memory 1604, main memory 1612, static memory 1614, and/or memory of the processors 1602) and/or storage unit 1616 may store one or more sets of instructions and data structures (e.g., software) embodying or utilized by any one or more of the methodologies or functions described herein. These instructions (e.g., the instructions 1608), when executed by processors 1602, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1620 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1620 or a portion of the network 1620 may include a wireless or cellular network, and the coupling 1624 may be a Code Division Multiple Access (CDMA) connection, a Global System for Mobile communications (GSM) connection, or another type of cellular or wireless coupling. In this example, the coupling 1624 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1608 may be transmitted or received over the network 1620 using a transmission medium via a network interface device (e.g., a network interface component included in the communication components 1640) and utilizing any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1608 for execution by the machine 1600, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a matter as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A data aggregator and anonymizer for selective encryption of test data, the data aggregator and anonymizer comprising:
    a processor; and
    a memory storing instructions that, when executed by the processor, configure the data aggregator and anonymizer to perform operations including:
    receiving first order data from a first data source, the first order data including a mix of sensitive and non-sensitive information, the sensitive information including one or more of Personally Identifiable Information (PII), Protected Health Information (PHI) and Payment Card Industry (PCI) information;
    receiving second order data from a second data source, the second order data including a different mix of sensitive and non-sensitive information, the sensitive information including one or more of PII, PHI, and PCI information;
    wherein the first and second data sources are first and second tenants each comprising multiple users in a multitenant network, and wherein the data aggregator and anonymizer resides at a subscription service to which the first and second tenants subscribe;
    combining and storing the first and second order data into an aggregated data structure, the aggregated data structure including layers in which stored data resides;
    identifying the sensitive information in the first and second order data;
    encrypting identified sensitive information stored in at least one layer of the aggregated data structure to create an anonymous body of test data;
    storing the anonymous body of test data in a database; and
    providing access to the anonymous body of test data to the first or second tenant, wherein providing access to the first or second tenant includes providing a decryption key to unlock a portion of the aggregated test data sourced from the first or second tenant supplying that portion, the decryption key disallowing decryption of any other portion of the aggregated test data.

2. The data aggregator and anonymizer of claim 1, wherein encrypting the identified sensitive information includes applying an encryption to a first layer of the aggregated data structure, rendering sensitive data included in the first layer anonymous.

3. The data aggregator and anonymizer of claim 2, wherein the first layer of the aggregated data structure is lower than a higher second layer in the aggregated data structure; and
    wherein a user access to the lower first layer is wider than user access to the higher second layer.

4. The data aggregator and anonymizer of claim 3, wherein sensitive data residing in the second layer in the aggregated data structure is not encrypted in the second layer and user access thereto is unrestricted.

5. The data aggregator and anonymizer of claim 1, wherein the operations further comprise decrypting a processed portion of the anonymous body of test data when delivering or presenting the processed portion to one of the first and second data sources.

6. A method of data aggregation and anonymization for selective encryption of test data, the method comprising:
    receiving first order data from a first data source, the first order data including a mix of sensitive and non-sensitive information, the sensitive information including one or more of Personally Identifiable Information (PII), Protected Health Information (PHI) and Payment Card Industry (PCI) information;
    receiving second order data from a second data source, the second order data including a different mix of sensitive and non-sensitive information, the sensitive information including one or more of PII, PHI, and PCI information;
    wherein the first and second data sources are first and second tenants each comprising multiple users in a multitenant network, and wherein the data aggregator and anonymizer resides at a subscription service to which the first and second tenants subscribe;

combining and storing the first and second order data into an aggregated data structure, the aggregated data structure including layers in which stored data resides;

identifying the sensitive information in the first and second order data;

encrypting identified sensitive information stored in at least one layer of the aggregated data structure to create an anonymous body of test data;

storing the anonymous body of test data in a database; and providing access to the anonymous body of test data to the first or second tenant, wherein providing access to the first or second tenant includes providing a decryption key to unlock a portion of the aggregated test data sourced from the first or second tenant supplying that portion, the decryption key disallowing decryption of any other portion of the aggregated test data.

7. The method of claim 6, wherein encrypting the identified sensitive information includes applying an encryption to a first layer of the aggregated data structure, rendering sensitive data included in the first layer anonymous.

8. The method of claim 7, wherein the first layer of the aggregated data structure is lower than a higher second layer in the aggregated data structure; and wherein a user access to the lower first layer is wider than user access to the higher second layer.

9. The method of claim 8, wherein sensitive data residing in the second layer in the aggregated data structure is not encrypted in the second layer and user access thereto is unrestricted.

10. The method of claim 6, further comprising decrypting a processed portion of the anonymous body of test data when delivering or presenting the processed portion to one of the first and second data sources.

11. A non-transitory, machine-readable medium including instructions which, when read by a machine, cause the machine to perform operations comprising:

receiving first order data from a first data source, the first order data including a mix of sensitive and non-sensitive information, the sensitive information including one or more of Personally Identifiable Information (PII), Protected Health Information (PHI) and Payment Card Industry (PCI) information;

receiving second order data from a second data source, the second order data including a different mix of sensitive and non-sensitive information, the sensitive information including one or more of PII, PHI, and PCI information;

wherein the first and second data sources are first and second tenants each comprising multiple users in a multitenant network, and wherein the data aggregator and anonymizer resides at a subscription service to which the first and second tenants subscribe;

combining and storing the first and second order data into an aggregated data structure, the aggregated data structure including layers in which stored data resides;

identifying the sensitive information in the first and second order data;

encrypting identified sensitive information stored in at least one layer of the aggregated data structure to create an anonymous body of test data;

storing the anonymous body of test data in a database; and providing access to the anonymous body of test data to the first or second tenant, wherein providing access to the first or second tenant includes providing a decryption key to unlock a portion of the aggregated test data sourced from the first or second tenant supplying that portion, the decryption key disallowing decryption of any other portion of the aggregated test data.

12. The medium of claim 11, wherein encrypting the identified sensitive information includes applying an encryption to a first layer of the aggregated data structure, rendering sensitive data included in the first layer anonymous.

13. The medium of claim 12, wherein the first layer of the aggregated data structure is lower than a higher second layer in the aggregated data structure; and wherein a user access to the lower first layer is wider than user access to the higher second layer.

14. The medium of claim 13, wherein sensitive data residing in the second layer in the aggregated data structure is not encrypted in the second layer and user access thereto is unrestricted.

15. The medium of claim 14, wherein the operations further comprise decrypting a processed portion of the anonymous body of test data when delivering or presenting the processed portion to one of the first and second data sources.

* * * * *